US011118666B2

(12) United States Patent
Richards et al.

(10) Patent No.: US 11,118,666 B2
(45) Date of Patent: Sep. 14, 2021

(54) AXLE ASSEMBLY WITH DISCONNECTING DIFFERENTIAL COMPONENT

(71) Applicant: AMERICAN AXLE & MANUFACTURING, INC., Detroit, MI (US)

(72) Inventors: Steven T. Richards, Lapeer, MI (US); Douglas J. Chemelli, Royal Oak, MI (US); Joseph S. Balenda, II, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 57 days.

(21) Appl. No.: 16/520,432

(22) Filed: Jul. 24, 2019

(65) Prior Publication Data

US 2019/0344661 A1 Nov. 14, 2019

Related U.S. Application Data

(63) Continuation of application No. 15/220,811, filed on Jul. 27, 2016, now Pat. No. 10,391,861.

(51) Int. Cl.
*F16H 48/40* (2012.01)
*B60K 17/16* (2006.01)
(Continued)

(52) U.S. Cl.
CPC .......... *F16H 48/40* (2013.01); *B60K 17/165* (2013.01); *F16H 48/38* (2013.01); *B60K 5/02* (2013.01); *B60K 17/344* (2013.01); *B60K 17/3462* (2013.01); *B60K 23/08* (2013.01); *B60K 2023/0825* (2013.01);
(Continued)

(58) Field of Classification Search
CPC ................ B60K 17/165; B60K 17/344; B60K 17/3462; B60K 17/16; B60K 23/08; B60K 2023/0825; B60K 5/02; B60Y 2400/421; F16H 48/40; F16H 48/08; F16H 48/38; F16H 2048/346
See application file for complete search history.

(56) References Cited

U.S. PATENT DOCUMENTS

| 1,435,473 A | 11/1922 | Isaacson |
| 2,150,468 A | 3/1939 | Thompson |

(Continued)

*Primary Examiner* — Charles A Fox
*Assistant Examiner* — Lori Wu
(74) *Attorney, Agent, or Firm* — Burris Law, PLLC (57) ABSTRACT

A differential assembly includes a differential, a collar, and a coupling. The differential has a differential input and differential gearing. The differential input is rotatable about a differential axis. The differential gearing has first and second differential output gears that are rotatable relative to the differential input about the differential axis. The differential gearing transmits rotary power between the differential input and the first and second differential output gears. The collar is rotatable about the differential axis. The coupling has first and second coupling members. The first coupling member is fixedly coupled to the first side gear. The second coupling member is fixedly coupled to the collar. The coupling is operable in a disengaged mode, in which the collar is rotationally decoupled from the first differential output gear, and an engaged mode in which the collar is rotatably coupled to the first differential output gear.

18 Claims, 5 Drawing Sheets

(51) Int. Cl.
*F16H 48/38* (2012.01)
*B60K 5/02* (2006.01)
*B60K 17/344* (2006.01)
*B60K 23/08* (2006.01)
*F16H 48/34* (2012.01)
*B60K 17/346* (2006.01)
*F16H 48/08* (2006.01)

(52) U.S. Cl.
CPC ......... *B60Y 2400/421* (2013.01); *F16H 48/08* (2013.01); *F16H 2048/346* (2013.01)

(56) References Cited

U.S. PATENT DOCUMENTS

| | | | |
|---|---|---|---|
| 4,271,722 A | 6/1981 | Campbell | |
| 4,994,005 A | 2/1991 | Rennerfelt | |
| 5,158,507 A * | 10/1992 | Guimbretiere | B60K 17/20 192/54.5 |
| 5,839,986 A | 11/1998 | Yamazaki | |
| 6,083,134 A | 7/2000 | Godlew | |
| 6,460,677 B1 | 10/2002 | Roscoe | |
| 6,520,885 B2 | 2/2003 | Gassmann et al. | |
| 6,958,030 B2 | 10/2005 | DeGowske | |
| 7,211,020 B2 | 5/2007 | Gohl et al. | |
| 7,325,664 B2 | 2/2008 | Fusegi | |
| 7,399,248 B2 | 7/2008 | Kleinhans et al. | |
| 7,425,185 B2 | 9/2008 | Donofrio et al. | |
| 7,744,500 B2 | 6/2010 | Donofrio et al. | |
| 8,042,642 B2 | 10/2011 | Marsh et al. | |
| 8,851,212 B2 | 10/2014 | Kahl | |
| 8,926,471 B2 | 1/2015 | Yamanaka et al. | |
| 9,302,581 B1 | 4/2016 | Valente | |
| 2002/0155913 A1 | 10/2002 | Fusegi et al. | |
| 2012/0238388 A1* | 9/2012 | Fusegi | F16H 48/30 475/150 |
| 2012/0277051 A1* | 11/2012 | Cooper | F16H 48/34 475/220 |
| 2013/0277165 A1 | 10/2013 | Andonian et al. | |
| 2016/0265639 A1* | 9/2016 | Peak | B60K 17/165 |
| 2017/0198798 A1* | 7/2017 | Ziech | B60K 17/3462 |
| 2020/0391590 A1* | 12/2020 | Maruyama | B60K 17/02 |

* cited by examiner

AXLE ASSEMBLY WITH DISCONNECTING DIFFERENTIAL COMPONENT

CROSS-REFERENCE TO RELATED APPLICATIONS

This application is a continuation of U.S. application Ser. No. 15/220,811 filed Jul. 27, 2016, the disclosure of which is incorporated by reference as if fully set forth in detail herein.

FIELD

The present disclosure relates to an axle assembly with a disconnecting differential output.

BACKGROUND

This section provides background information related to the present disclosure which is not necessarily prior art.

Vehicle drivelines typically include one or more differentials configured to receive input torque and to output differential torque to a plurality of vehicle wheels. Typically, the differential includes a differential case configured to receive input torque, a pair of side gears and a pair of output shafts non-rotatably coupled to a respective one of the side gears and drivingly connected to a respective vehicle wheel. Under some conditions, torque is not desired from the vehicle wheels that are normally driven by the differential. In such conditions, a disconnect system can be used to interrupt torque transmission to the vehicle wheels. Disconnect systems typically include a disconnecting clutch configured to either disconnect the differential case from the torque supply, or to disconnect one or more of the output shafts from the vehicle wheels. Such disconnect clutches are typically mounted external to the differential case and can include bulky disconnect collars or clutch plates, which can significantly increase the size, weight, and complexity of the driveline relative to a non-disconnecting driveline. While these configurations may work for their intended purpose, they are nevertheless susceptible to improvement.

SUMMARY

This section provides a general summary of the disclosure, and is not a comprehensive disclosure of its full scope or all of its features.

In one form, the present disclosure provides for a disconnecting differential assembly including a differential case, a pair of pinion gears, a first side gear, a second side gear, a first dog, a second dog, and an actuator. The differential case can define a cavity. The differential case can be configured to rotate about a first axis. The differential case can include a first end wall. The pair of pinion gears can be disposed within the cavity. Each pinion gear can be coupled to the differential case for common rotation about the first axis and for rotation relative to the differential case about a second axis that is transverse to the first axis. The first side gear can be disposed within the cavity and can be meshingly engaged with the pinion gears. The first side gear can be rotatable about the first axis relative to the differential case. The second side gear can be disposed within the cavity and can be meshingly engaged with the pinion gears. The second side gear can be rotatable about the first axis relative to the differential case. The first dog can include a plurality of first engagement features that can be fixedly coupled to the first side gear and disposed within the cavity between the first side gear and the first end wall. The second dog can include a plurality of second engagement features and an annular body disposed about the first axis. The second engagement features can be radially outward of the annular body and fixedly coupled to the annular body. The annular body and second engagement features can be disposed within the differential case axially between the first end wall and the first dog. The second dog can be rotatable relative to the differential case and can be axially movable relative to the differential case between a first position wherein the second engagement features can be disengaged from the first engagement features to permit relative rotation between the first and second dogs, and a second position wherein the first engagement features can be engaged with the second engagement features to couple the first and second dogs for common rotation. The annular body can be adapted to be non-rotatably coupled to an output shaft when the second dog is in the first position and when the second dog is in the second position. The actuator can be configured to move the second dog between the first and second positions.

In another form, the present disclosure provides for an axle assembly including an axle housing, a first output shaft, a second output shaft, a differential assembly, a linear motor and a thrust member. The differential assembly can be disposed within the axle housing and can be rotatable about a rotary axis. The differential assembly can include a differential case, a differential gearset, a first dog, and a second dog. The differential case can define a cavity. The differential gearset can be disposed within the cavity. The differential gearset can include a first side gear and a second side gear. The differential gearset can be configured to receive input torque from the differential case and to transmit differential torque to the first and second side gears. The second side gear can be non-rotatably coupled to the second output shaft. The first dog can include a set of first engagement features that can be fixedly coupled to the first side gear and disposed within the cavity. The second dog can be disposed within the cavity and can be rotatable relative to the differential case. The second dog can include an annular body and a set of second engagement features that can be fixedly coupled to the annular body. The annular body can be non-rotatably coupled to the first output shaft. The annular body can be axially translatable relative to the differential case and the first output shaft between a first position, in which the second engagement features are disengaged from the first engagement features to permit relative rotation between the first side gear and the first output shaft, and a second position in which the second engagement features can be meshingly engaged with the first engagement features to inhibit relative rotation between the first side gear and the first output shaft. The thrust member can extend through a first end wall of the differential case. The thrust member can be non-rotatably coupled to the differential case and configured to transmit linear motion from the linear motor to the annular body while being rotatable relative to the annular body to move the annular body from the first position to the second position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
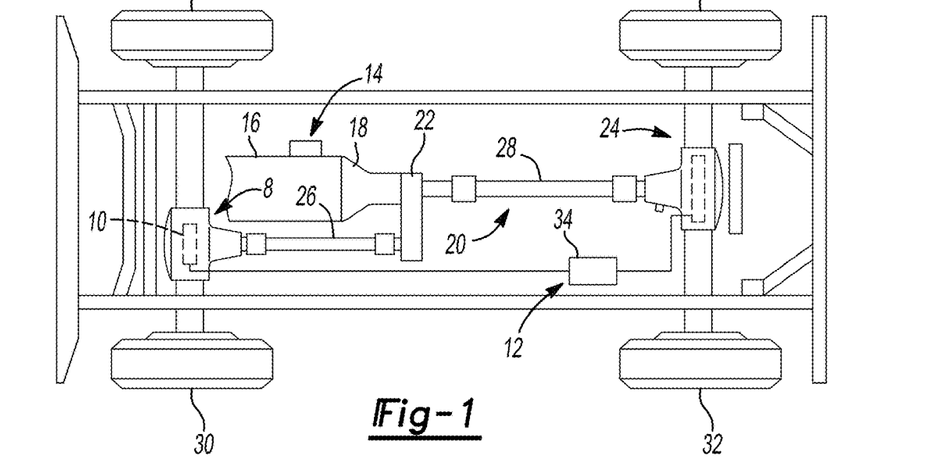
FIG. 1 is a schematic illustration of a vehicle having a front axle assembly with an exemplary disconnecting differential assembly constructed in accordance with the teachings of the present disclosure.

With reference to FIG. 1 of the drawings, a vehicle 6 is schematically illustrated as having a front axle assembly 8 with a disconnecting differential assembly 10 constructed in accordance with the teachings of the present disclosure. The vehicle 6 is a four-wheel drive vehicle having a control system 12, powertrain 14 with an engine 16 and a transmission 18 that provide rotary power to a drivetrain 20 having a transfer case 22, the front axle assembly 8 and a rear axle assembly 24. Rotary power can be transmitted from the transfer case 22 to the front axle assembly 8 and the rear axle assembly 24 via front and rear propshafts 26 and 28, respectively. The front axle assembly 8 can be configured to drive a set of front wheels 30.

The rear axle assembly 24 can be configured to drive a set of rear wheels 32. The configuration of the rear axle assembly 24 can be generally similar to that of the front axle assembly 8 and as such, a discussion of the front axle assembly 8 will suffice for the rear axle assembly 24. In other words, the rear axle assembly 24 can be constructed to have a disconnecting differential assembly similar to the disconnecting differential assembly 10, described herein. Those of skill in the art will appreciate that other configurations can be used. In an alternative construction, the front axle assembly 8 includes the disconnecting differential assembly 10, while the rear axle assembly 24 is configured differently, or does not include a disconnecting differential assembly. In another alternative construction, the rear axle assembly 24 includes a disconnecting differential assembly similar to the disconnecting differential assembly 10, while the front axle assembly 8 does not include the disconnecting differential assembly 10.

In the example provided, the control system 12 can include a control module 34. The control module 34 can be any suitable type of controller configured to control operation of the disconnecting differential assembly 10 as described below. The disconnecting differential assembly 10 can be electrically coupled to the control module 34.

While the disconnecting differential assembly 10 is described herein with reference to a four-wheel drive vehicle, the disconnecting differential assembly 10 of the present teachings can be used in other types of vehicles, such as front-wheel drive, rear-wheel drive, or all-wheel drive vehicles for example.

Figure 2:
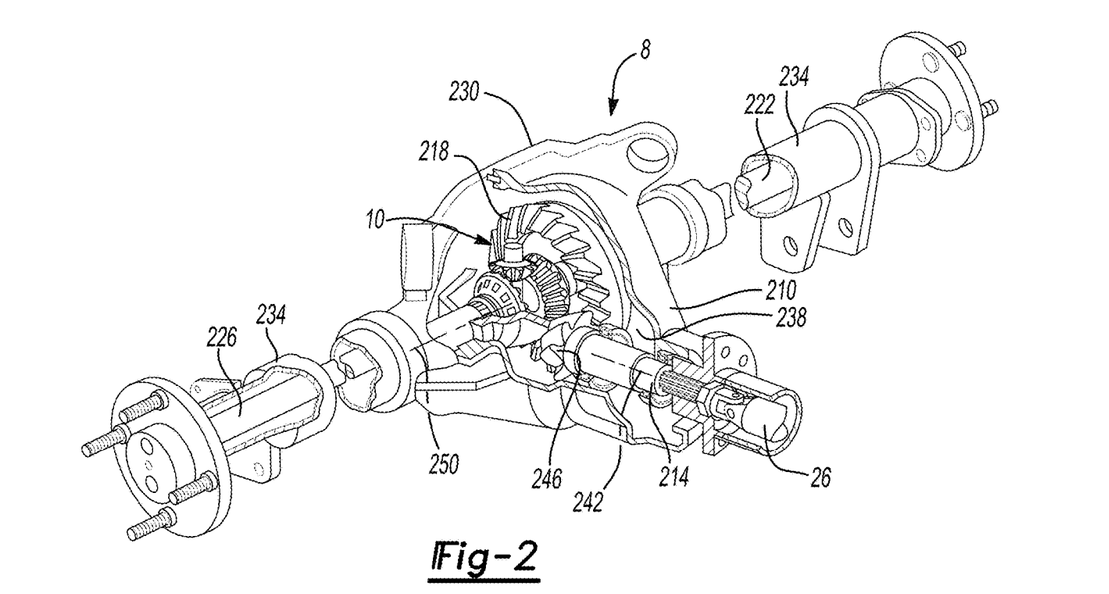
FIG. 2 is a perspective, partial-sectional view of the front axle assembly of FIG. 1.

In FIG. 2, the front axle assembly 8 is illustrated as including an axle housing assembly 210, an input pinion 214, a ring gear 218, the disconnecting differential assembly 10, and a pair of axle shafts or output shafts 222, 226. The axle housing assembly 210 can be any type of housing assembly, such as a Banjo-type axle housing assembly, but in the particular example provided, the axle housing assembly 210 is a Salisbury-type axle housing assembly having a carrier housing 230 and a pair of axle tubes 234 that are coupled to the carrier housing 230 in a conventional and well known manner. The carrier housing 230 can define a cavity 238 into which the disconnecting differential assembly 10 is received.

Each of the output shafts 222, 226 can be coaxially received through a corresponding one of the axle tubes 234. The output shafts 222, 226 can extend into the cavity 238 and be drivingly coupled to the disconnecting differential assembly 10 as described below to receive rotary power therefrom as described below. Each output shaft 222, 226 can be drivingly coupled to one of the front wheels 30 (FIG. 1).

The input pinion 214 can be mounted to the carrier housing 230 for rotation about a first axis 242. The input pinion 214 can be coupled for rotation with the front propshaft 26 and can include a pinion gear 246 that can be disposed in the cavity 238. The ring gear 218 can be received in the cavity 238 and rotatable about a second axis 250 that can be transverse or generally perpendicular to the first axis 242. The ring gear 218 can be meshingly engaged to the pinion gear 246.

Figure 3:
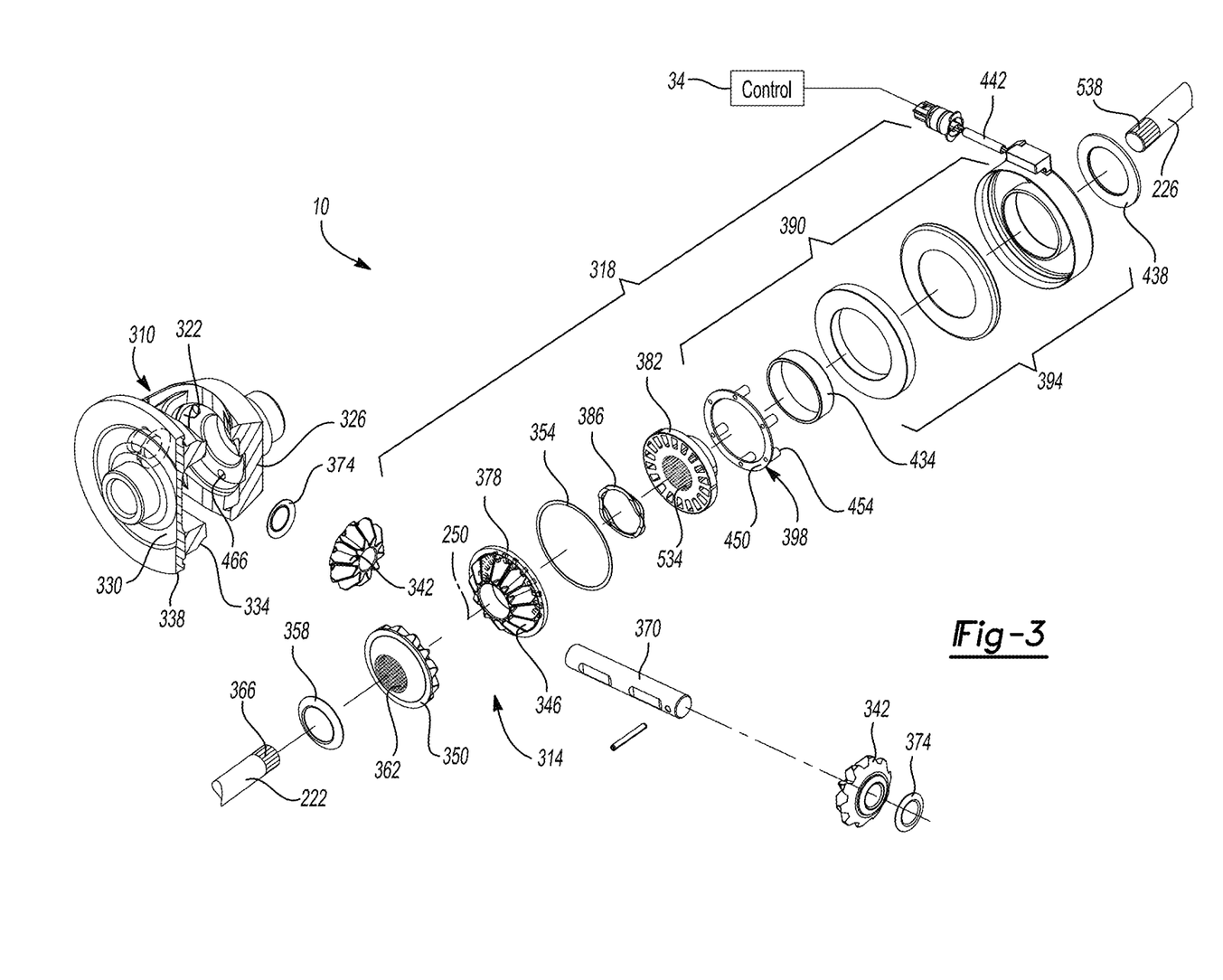
FIG. 3 is an exploded perspective view of a portion of the front axle assembly of FIG. 1, illustrating the disconnecting differential assembly in more detail.
Figure 4:
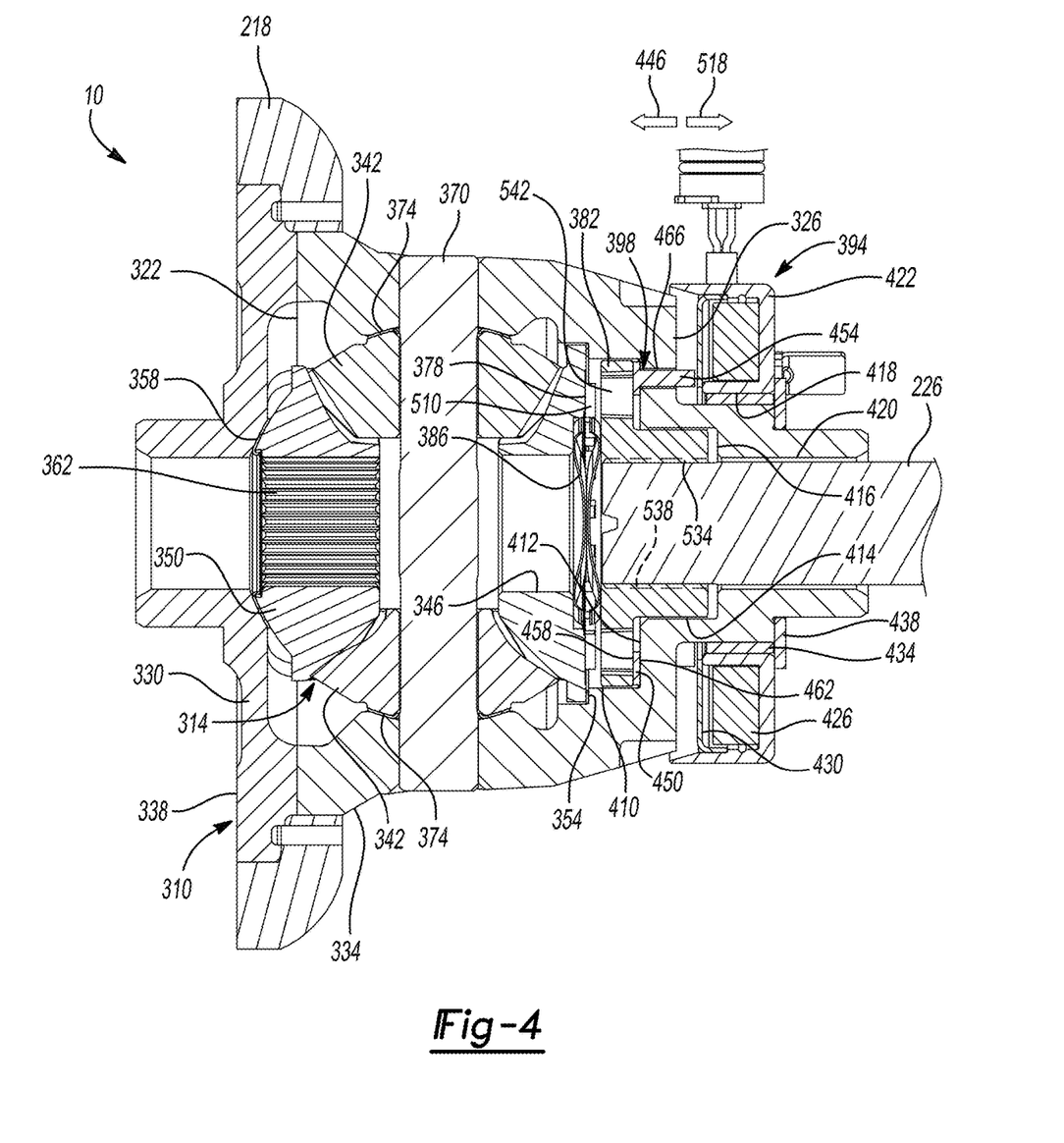
FIG. 4 is a longitudinal sectional view of the disconnecting differential assembly.

With additional reference to FIGS. 3 and 4, the disconnecting differential assembly 10 can include a differential case 310, a differential gearset 314, and a clutch 318. The differential case 310 can be mounted to the axle housing assembly 210 for rotation about the second axis 250, which can be transverse or perpendicular to the first axis 242. The differential case 310 can be formed as one or more discrete components and can define a differential cavity 322 that can be bounded on opposite sides by first and second end walls 326 and 330, respectively. In the particular example provided, the differential case 310 is an assembly that is formed of first and second case members 334 and 338 that are bolted or welded to one another and the ring gear 218.

The first end wall 326 can define a first recess or step and a second recess or step within the differential cavity 322. The first step can be coaxial with the second axis 250 and axially between the first side gear 346 and the second step. In the example provided, the first step can have a first circumferential surface 410 and a first outboard surface 412 that extends radially inward from an outboard side of the first circumferential surface 410.

The second step can be coaxial with the second axis 250 and can have a second circumferential surface 414 that extends axially outboard from the first outboard surface 412, and a second outboard surface 416 that extends radially inward from an outboard side of the second circumferential surface 414. The first circumferential surface 410 can have a first diameter and the second circumferential surface 414 can have a second diameter that can be less than the first diameter. The first outboard surface 412 can extend radially inward to terminate at the second circumferential surface 414. The second outboard surface 416 can extend radially inward to a third diameter to define an aperture 420 through which the output shaft 226 can extend through the first end wall 326 and into the differential cavity 322.

The differential gearset 314 can be any type of gearset that can receive rotary power from the differential case 310 and output rotary power to the output shafts 222 and 226. In the particular example provided, the differential gearset 314 comprises bevel gearing (i.e., two or more bevel pinions 342 that are meshingly engaged with first and second (bevel) side gears 346 and 350), but it will be appreciated that other types of gear arrangements, such as spur or helical gear arrangements, could be employed in the alternative.

The differential gearset 314 can include a pair of output members, i.e., the first and second side gears 346 and 350, which can be disposed within the differential cavity 322 proximate to opposite ones of the first and second end walls 326, 330. The first and second side gears 346 and 350 can be rotatable about the second axis 250 relative to each other and relative to the differential case 310. A bearing or washer 354 can be disposed between the first end wall 326 and the first side gear 346. In the example provided, the washer 354 is a flat, annular thrust washer coaxial with the second axis 250, though other configurations can be used. A bearing or washer 358 can be disposed between the second end wall 330 and the second side gear 350. In the example provided, the washer 358 is an annular, frusto-conically shaped thrust washer coaxial with the second axis 250, though other configurations can be used.

The first side gear 346 can be rotatable relative to the output shafts 222, 226. The first side gear 346 can be meshingly engaged with both bevel pinions 342. The second side gear 350 can be drivingly coupled to the output shaft 226 in a conventional manner. In the example provided, the second side gear 350 has a set of interior splines 362 that are disposed about the second axis 250 and about an interior of the second side gear 350. The interior splines 362 are meshingly engaged with mating external splines 366 formed on the output shaft 226. The second side gear 350 can be meshingly engaged with both bevel pinions 342.

In the example provided, the bevel pinions 342 are mounted within the differential cavity 322 to a center pin 370 that is coupled to the differential case 310 and transverse or perpendicular to the second axis 250. The bevel pinions 342 are mounted to the center pin 370 to be rotatable relative to the differential case 310 about the center pin 370 and to rotate with the differential case 310 about the second axis 250. A bearing or washer 374 can be disposed between each bevel pinion 342 and the differential case 310. In the example provided, the washers 374 are annular, frusto-conical shaped thrust washers coaxial with the center pin 370, though other configurations can be used.

Figure 5:
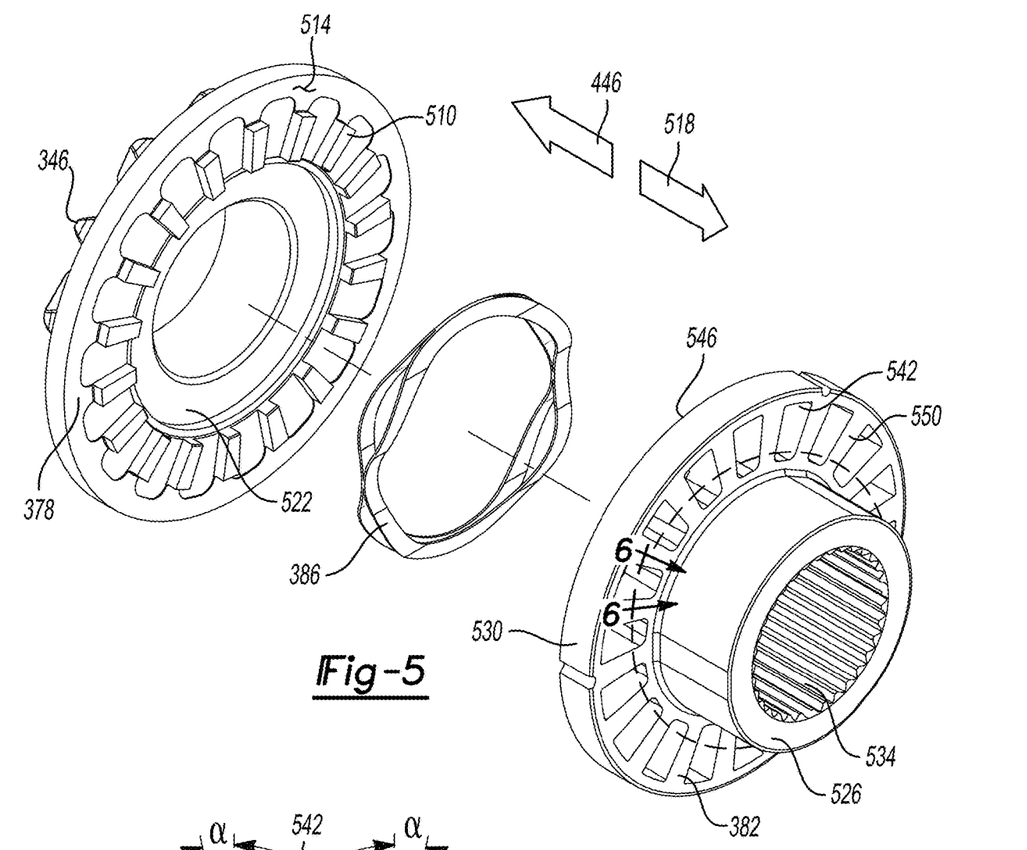
FIG. 5 is an exploded perspective view of a portion of a clutch of the disconnecting differential assembly of FIG. 3.

With continued reference to FIGS. 3 and 4 and additional reference to FIG. 5, the clutch 318 can include a first dog 378, a second dog 382, a spring 386, and an actuator 390. The first dog 378 can be fixedly coupled to the first side gear 346 and can be disposed on an opposite axial side of the first side gear 346 from the teeth of the first side gear 346 (e.g., an outboard axial side of the first side gear 346). In the example provided, the first dog 378 has a generally annular shape that is coaxial with the second axis 250. The first dog 378 can include a plurality of first engagement features 510 which can be disposed circumferentially about the second axis 250.

In the example provided, the first engagement features 510 are protrusions or dog teeth that are circumferentially spaced about the second axis 250 and extend axially from a generally flat surface 514 of the first dog 378, in an outboard axial direction 518 (e.g., toward the first end wall 326). In the example provided, the first engagement features 510 are radially outward of the output shafts 222, 226. In the example provided, the washer 354 is disposed radially outward of the first engagement features 510 and can contact the surface 514 and the first end wall 326 to permit relative rotation between the first dog 378 and the first end wall 326. In the example provided, the first dog 378 also includes an annular recess 522 disposed radially inward of the first engagement features 510. The annular recess 522 can be axially recessed from the surface 514. The spring 386 can be received in the annular recess 522 such that the spring 386 is coaxially disposed about the second axis 250. The spring 386 can be a compression spring and can partially extend axially outward from the annular recess and axially beyond the surface 514.

The second dog 382 can have a generally annular shaped collar portion 526 and a generally annular an engagement portion 530 that can both be disposed coaxially about the second axis 250 and within the differential cavity 322. The collar portion 526 can be fixedly coupled to the engagement portion 530. The collar portion 526 can have an outermost diameter that is less than the second inner diameter of the second circumferential surface 414 and can be disposed axially between the first dog 378 and the second outboard surface 416. The collar portion 526 can have an axial length that is greater than an axial length of the engagement portion 530 and greater than an axial length of the second circumferential surface 414.

The engagement portion 530 can be disposed at an axial end of the collar portion 526 that is proximate to the first dog 378. The engagement portion 530 can extend radially outward from the collar portion 526 and can have an outermost diameter that is less than the first inner diameter of the first circumferential surface 410 and be disposed axially between the first dog 378 and the first outboard surface 412. The engagement portion 530 can have an axial length that can be less than an axial length of the first circumferential surface 410.

In the example provided, the second dog 382 is disposed entirely within the differential cavity 322 and does not extend outside the differential case 310. The second dog 382 can be rotatable relative to the differential case 310 about the second axis 250 and can be disposed axially between the first dog 378 and the first end wall 326 of the differential case 310. The second dog 382 can be non-rotatably coupled to the output shaft 222. The second dog 382 can be axially translatable relative to the output shaft 222.

In the example provided, the second dog 382 includes a central aperture that extends through the collar portion 526 and defines a plurality of internal splines 534 that mate with a plurality of external splines 538 (FIG. 3) defined by an end of the output shaft 222. The internal and external splines 534, 538 couple the second dog 382 to the output shaft 222 for common rotation, while permitting the second dog 382 to translate axially relative to the output shaft 222. The second dog 382 can translate relative to the output shaft 222 between a first position (e.g., a disconnected position, shown in FIG. 4) and a second position (e.g., a connected position, shown in FIG. 6). When the second dog 382 is in the first position (e.g., disconnected position), the engagement portion 530 is spaced apart from the first dog 378 by a greater distance than when in the second position (e.g., connected position). The spring 386 can engage the second dog 382 and bias the second dog 382 away from the first dog 378 and toward the first position (e.g., disconnected position).

Figure 6:
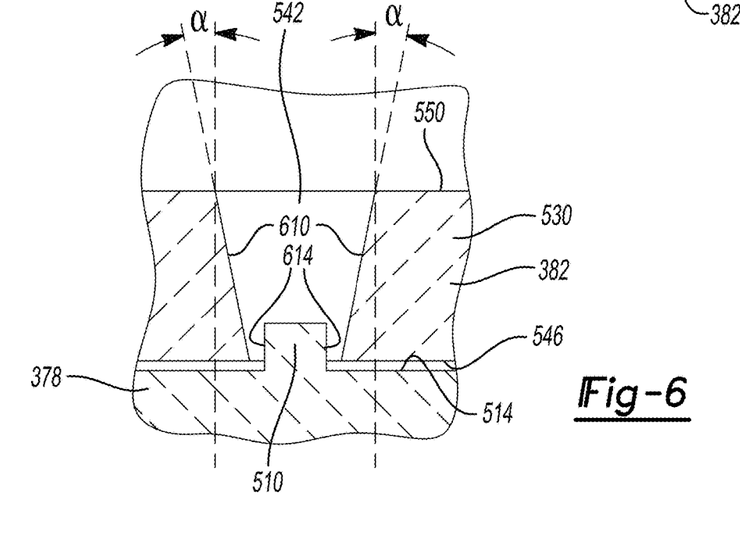
FIG. 6 is a sectional view of a portion of the clutch of FIG. 5, taken along arc 6-6 shown in FIG. 5, and illustrating a second dog of the clutch in a connected position.

The engagement portion 530 can include a plurality of second engagement features 542 configured to engage the first engagement features 510 when the second dog 382 is in the second position (e.g., connected position). In the example provided, the second engagement features are apertures that extend through both opposite axial sides 546, 550 of the engagement portion 530 and are configured to receive the first engagement features 510 (e.g., protrusions or dog teeth) into the second engagement features 542 (e.g., apertures) when the second dog 382 is in the second position (e.g., connected position) to couple the first and second dogs 378, 382 for common rotation. When the second dog 382 is in the first position (e.g., disconnected position), the second engagement features 542 can be disengaged from the first engagement features 510 to permit relative rotation of the first dog 378 and the second dog 382. The second engagement features 542 can be radially outward of the collar portion 526. The number of second engagement features 542 can be equal to the number of first engagement features 510. With specific reference to FIG. 4, the second engagement features 542 can be radially between the first and second circumferential surfaces and axially between the first dog and the first outboard surface.

With additional reference to FIG. 6, a sectional view, taken along arc 6-6 shown in FIG. 5 and looking radially inward toward the second axis 250, is illustrated with the second dog 382 in the second position (e.g., connected position). The second engagement features 542 can have second engagement walls 610 that can extend radially outward relative to the second axis 250. The second engagement walls 610 can be tapered at an angle α from the first axial side 546 to the second axial side 550 such that the opening of the second engagement features 542 at the first axial side 546 can be smaller than the opening at the second axial side 550. In the example provided, the second engagement walls 610 are tapered at an angle α of 1.5°, though other configurations can be used.

The first engagement features 510 can be received into the second engagement features 542 through the first axial side 546. This back-taper of the second engagement walls 610 can allow for the second engagement walls 610 to be self-locking when engaging corresponding first engagement walls 614 of the first engagement features 510 under load. The second engagement features 542 extending through both axial sides 546, 550 permits the second dog 382 to have the above mentioned back-taper while being manufactured net shape in a conventional and economical manner, such as powder metal processes or forging for example.

In the example provided, the first engagement walls 614 of the first engagement features 510 are not tapered. In an alternate configuration, not specifically shown, the first engagement walls 614 can be tapered to matingly oppose the second engagement walls 610 to provide greater self-locking characteristics. In an alternative construction, not specifically shown, the second engagement walls 610 can be non-tapered (i.e., angle α=0).

Returning to FIGS. 3 and 4, the actuator 390 can be any type of device or linear motor that can be employed to selectively translate the second dog 382 along the second axis 250. In the particular example provided, the actuator 390 includes an annular solenoid 394 and a thrust member 398. In an alternative configuration, not specifically shown, the actuator 390 can be another type of linear motor, such as a hydraulic, mechanical, or electro-mechanical linear motor (e.g., hydraulic ram, ball ramp, screw drive, etc.) for selectively translating the second dog 382 along the second axis 250.

Returning to the example provided, the annular solenoid 394 can be mounted on the differential case 310 in a manner that permits rotation of the differential case 310 relative to the annular solenoid 394 but which limits movement of the annular solenoid 394 along the second axis 250 in a direction away from the second dog 382. In other words, the annular solenoid 394 can be axially fixed relative to the differential case 310, but the differential case 310 can rotate about the second axis 250 relative to the annular solenoid 394. The annular solenoid 394 can be disposed about an annular portion 418 of the first end wall 326.

The annular solenoid 394 can include a housing 422, an electromagnetic coil 426 and an annular plunger 430. The electromagnetic coil 426 and annular plunger 430 can be located within the housing 422. In the example provided, a bearing or bushing 434 is disposed radially between the annular portion 418 of the first end wall 326 and the housing 422, while a retaining ring 438 is disposed about the annular portion 418 and fixedly coupled to the differential case 310 axially outboard of the housing 422 to prevent axial outboard movement of the annular solenoid 394.

The annular plunger 430 can be selectively moved along the second axis 250 in response to energization of the electromagnetic coil 426. The electromagnetic coil 426 can be electrically coupled to the control module 34 (e.g., via an electrical cable 442) and operation of the electromagnetic coil 426 can be controlled by the control module 34 such that the control module 34 can control when the electromagnetic coil 426 is energized (i.e., electrical current flows through the electromagnetic coil 426). The annular solenoid 394 can be in an activated state when the electromagnetic coil 426 is energized and in a deactivated state when the electromagnetic coil 426 is de-energized. In the example provided, when the annular solenoid 394 is activated, the electromagnetic coil 426 produces a magnetic field (not shown) that can cause the annular plunger 430 to move axially in an inboard direction 446 (e.g., toward the engagement portion 530 of the second dog 382).

The thrust member 398 can include an annular thrust plate 450 and a plurality of legs 454. The thrust plate 450 can be disposed within the differential cavity 322 and can have an outermost diameter that is less than the first inner diameter of the first circumferential surface 410 and be disposed axially between the engagement portion 530 and the first outboard surface 412. A first side 458 of the thrust plate 450 can oppose and be in sliding contact with the second side 462 of the engagement portion 530 of the second dog 382, such that the second dog 382 can rotate relative to the thrust plate 450 while in contact with the thrust plate 450. A proximal end of each of the legs 454 can be fixedly coupled to a second side 462 of the thrust plate 450 that is opposite the first side 458 of the thrust plate 450. The legs 454 can extend axially in the outboard axial direction 518 to a distal end of each of the legs 454.

The legs 454 can be circumferentially spaced about the second side 462 of the thrust plate 450. Each of the legs 454 can extend through a corresponding aperture 466 defined by the first end wall 326 of the differential case 310, such that the thrust member 398 can rotate about the second axis 250 with the differential case 310. The legs 454 can be slidingly disposed in the apertures 466, such that the thrust member 398 can move axially relative to the differential case 310. The distal end of each of the legs 454 can slidingly contact the annular plunger 430, such that the thrust member 398 can rotate relative to the annular plunger 430 while in contact with the annular plunger 430.

The disconnecting differential assembly 10 can be operated in a first mode, in which the actuator 390 is deactivated and the spring 386 places the second dog 382 in the first position (e.g., disconnected position) so that the first engagement features 510 are disengaged from the second engagement features 542. In this mode, the first side gear 346 is permitted to rotate relative to the differential case 310 and relative to the second dog 382. In the example provided, since the first side gear 346 is free to rotate and the disconnecting differential assembly 10 is an open differential, torque is not transferred to either of the output shafts 222, 226. Similarly, the differential case 310 is not back-driven by rotation of the output shafts 222, 226.

The disconnecting differential assembly 10 can also be operated in a second mode, in which the actuator 390 is activated and places the second dog 382 in the second position so that the second engagement features 542 are engaged to the first engagement features 510. In this mode, the first side gear 346 is locked to the output shaft 222 for common rotation so that the disconnecting differential assembly 10 is operated as an open differential to permit output of differential torque between the output shafts 222, 226.

As described above, the spring 386 can bias the second dog 382 such that the disconnecting differential assembly 10 is normally in the first mode. When transmission of torque is desired, the control module 34 can energize the electromagnetic coil 426 to overcome the force of the spring 386 and drive the annular plunger 430 axially toward the first side gear 346. The annular plunger 430 can push the legs 454 to move the thrust member 398 axially toward the first side gear 346. The thrust plate 450 can push the second dog 382 axially until the first engagement features 510 engage the second engagement features 542. When transmission of torque is not desired, the control module 34 can de-energize the electromagnetic coil 426 to allow the spring 386 to move the second dog 382 axially out of engagement with the first dog 378, to return the disconnecting differential to the first mode.

Figure 7:
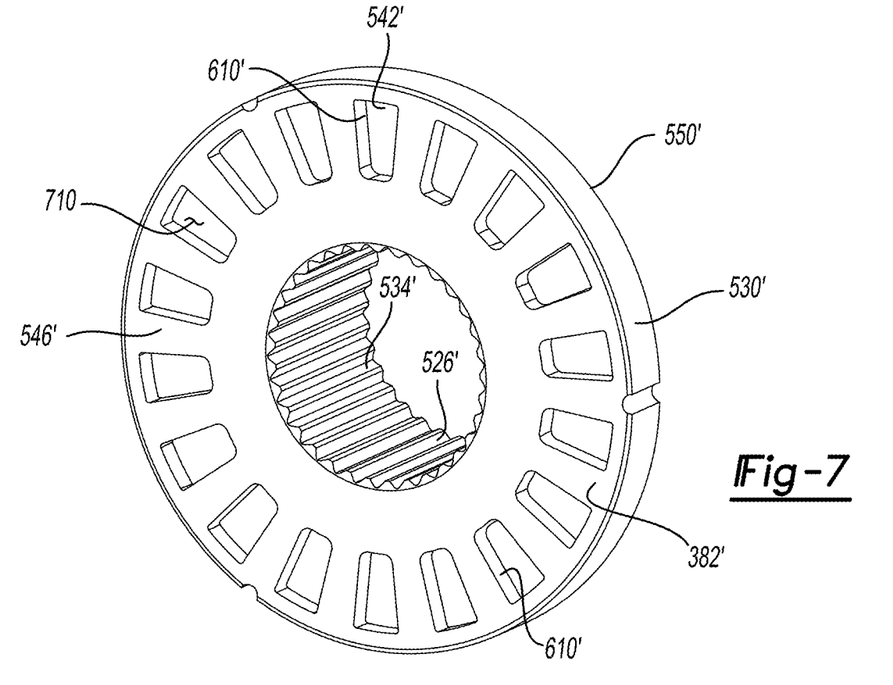
FIG. 7 is a perspective view of a second dog of a second construction in accordance with the teachings of the present disclosure.

With additional reference to FIG. 7, a second dog 382' of a second construction is illustrated. The second dog 382' is similar to the second dog 382 (FIGS. 3-6) except as otherwise shown or described herein. Aspects of the second dog 382' that are similar to the second dog 382 are shown and described with similar, but primed reference numerals. Accordingly, the descriptions of these aspects are not repeated, but are incorporated by reference with reference to the second dog 382'.

In the construction shown in FIG. 7, second engagement features 542' are open at the first axial side 546', but do not extend through the second axial side 550'. In other words, the second engagement features 542' are recesses that do not extend fully through the engagement portion 530' of the second dog 382' and are only open at the first axial side 546'. In this construction, the second engagement walls 610' can be tapered, similar to the second engagement walls 610 (FIG. 6), such that the second engagement features 542' narrow from the first axial side 546' to a recessed surface 710 that is between the first and second axial sides 546', 550'. In an alternative construction, the second engagement walls 610' are not tapered.

Figure 8:
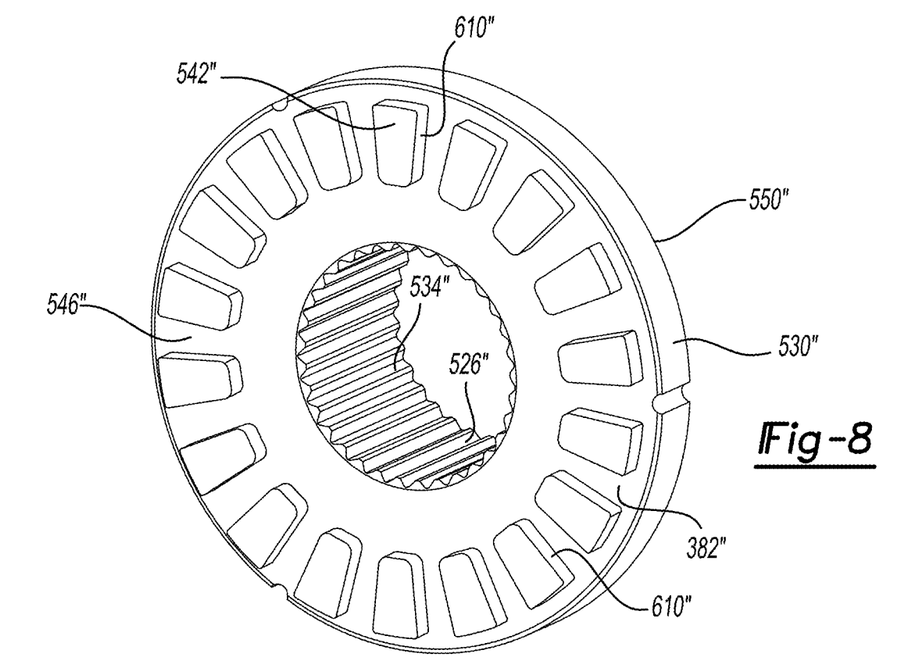
FIG. 8 is a perspective view of a second dog of a third construction in accordance with the teachings of the present disclosure.

With additional reference to FIG. 8, a second dog 382" of a third construction is illustrated. The second dog 382" is similar to the second dog 382 (FIGS. 3-6) except as otherwise shown or described herein. Aspects of the second dog 382" that are similar to the second dog 382 are shown and described with similar, but double primed numerals. Accordingly, the descriptions of these aspects are not repeated, but are incorporated by reference with reference to the second dog 382".

In the construction shown in FIG. 8, the second engagement features 542" are protrusion or teeth that extend axially from the first axial side 546" of the engagement portion 530". The second engagement features 542" are circumferentially spaced about the engagement portion 530" and configured to receive the first engagement features 510 (FIGS. 3-6) between adjacent ones of the second engagement features 542". In this way, the teeth of the first engagement features 510 (FIGS. 3-6) engage the teeth of the second engagement features 542" when the second dog 382" is in the second position (e.g., engaged position). The second engagement features 542" can have second engagement walls 610" that can be tapered, such that the teeth of the second engagement features 542" widen with greater distance from the first axial side 546. In an alternative construction, the second engagement walls 610" can be not tapered.

In an alternative construction, not specifically shown, the first engagement features of the first dog 378 (FIGS. 3-6) are recesses instead of protrusions and are configured to receive the second engagement features 542".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A differential assembly comprising:
a differential case configured to rotate about a first axis;
a differential gearset including at least one differential pinion and first and second side gears, the at least one differential pinion configured to transmit rotary power between the differential case and the first and second side gears;
a first dog coupled to the first side gear for rotation therewith, the first dog being located within the differential case;
a collar having an internally splined aperture disposed about the first axis; and
a second dog fixedly coupled to the collar, the second dog being located within the differential case; and
an actuator that is configured to move the collar and the second dog between the first and second positions, the actuator including a linear motor disposed annularly about an exterior of the differential case,
wherein the collar and the second dog are movable relative to the differential case along the first axis between a first position, in which the second dog is spaced apart from the first dog along the first axis to thereby rotationally decouple the first side gear from the collar and permit relative rotation therebetween, and a second position in which the second dog is engaged to the first dog to thereby rotationally couple the first side gear and the collar,
wherein, for all axial positions of the collar between the first position and the second position, torque is not transmitted between the differential case and the collar.

2. The differential assembly of claim 1 wherein the actuator includes a thrust member disposed axially between the linear motor and the second dog, the thrust member extending axially through an outboard wall of the differential case.

3. The differential assembly of claim 1 further comprising a spring, the spring biasing the second dog toward the first position, the spring applying an axial force on the first side gear to bias the first side gear axially apart from the second dog.

4. The differential assembly of claim 1, wherein the first dog includes a plurality of first engagement features, wherein the second dog includes a plurality of second engagement features, wherein the first engagement features include a first set of teeth that are circumferentially spaced about the first axis and extend axially toward the second dog from a first axial side of the first dog that is opposite the first side gear.

5. The differential assembly of claim 4, wherein the second engagement features include a set of apertures that are circumferentially spaced about the first axis and extend through at least a second axial side of the second dog, the first axial side opposing the second axial side, each of the apertures in the set of apertures being configured to receive a corresponding one of the teeth of the first set of teeth when the second dog is in the second position.

6. The differential assembly of claim 5, wherein each of the apertures in the set of apertures tapers such that each aperture is narrower proximate to a third axial side of the second dog than the second axial side.

7. The differential assembly of claim 4, wherein the second engagement features include a second set of teeth that are circumferentially spaced about the first axis and extend axially toward the first axial side of the first dog, each of the teeth of the second set of teeth being configured to be received between adjacent ones of the first set of teeth when the second dog is in the second position.

8. The differential assembly of claim 1, further comprising a first output shaft that is non-rotatably coupled to the collar.

9. The differential assembly of claim 1, further comprising:
an axle housing into which the differential case is received, the axle housing supporting the differential case for rotation about the first axis.

10. The differential assembly of claim 1 further comprising a spring disposed radially inward of the first dog and the second dog, the spring biasing the second dog toward the first position.

11. A differential assembly comprising:
a differential having a differential input, a differential case, and differential gearing, the differential input being fixed to the differential case and rotatable about a differential axis, the differential gearing having first and second differential output gears that are rotatable relative to the differential input about the differential axis, the differential gearing configured to transmit rotary power between the differential input and the first and second differential output gears;
a collar that is rotatable about the differential axis;
a coupling having first and second coupling members, the first coupling member being fixedly coupled to the first differential output gear, the second coupling member being fixedly coupled to the collar, the coupling being operable in a disengaged mode, in which the collar is rotationally decoupled from the first differential output gear, and an engaged mode in which the collar is rotatably coupled to the first differential output gear; and
a thrust member including a thrust plate and a plurality of legs, the thrust plate being disposed within the differential case and axially between the second coupling member and an axial end wall of the differential case, each leg of the plurality of legs extending from the thrust plate axially through the axial end wall of the differential case.

12. The differential assembly of claim 11, wherein the coupling comprises a dog clutch.

13. The differential assembly of claim 11, wherein the collar is fixedly coupled with the second coupling member.

14. The differential assembly of claim 11, wherein the first and second differential output gears are side gears.

15. The differential assembly of claim 14, wherein the differential gearing further comprises a plurality of differential pinions that are meshingly engaged with the first and second differential output gears.

16. The differential assembly of claim 11, further comprising a spring that biases the coupling into the disengaged mode.

17. The differential assembly of claim 16, wherein the spring applies an axial force to the first differential output gear to bias the first differential output gear axially apart from the collar.

18. A differential assembly comprising:
a differential having a differential input, a differential case, and differential gearing, the differential input being fixed to the differential case and rotatable about a differential axis, the differential gearing having first and second differential output gears that are rotatable relative to the differential input about the differential axis, the differential gearing configured to transmit rotary power between the differential input and the first and second differential output gears;
a collar that is rotatable about the differential axis;
a coupling having first and second coupling members, the first coupling member being fixedly coupled to the first differential output gear, the second coupling member being fixedly coupled to the collar, the coupling being operable in a disengaged engaged mode, in which the collar is rotationally decoupled from the first differential output gear, and an engaged mode in which the collar is rotatably coupled to the first differential output gear; and
a spring biasing the coupling into the disengaged mode, the spring applying an axial force to the first differential output gear and to the collar to bias the first differential output gear and the collar in opposite axial directions.

* * * * *